United States Patent [19]

Whelpton et al.

[11] 4,093,491
[45] June 6, 1978

[54] FASTENER INSTALLATION METHOD

[76] Inventors: Hugh G. Whelpton, 2059 W. Artesia, Torrance, Calif. 90504; William H. Trembley, 8463 Hiquera St., Culver City, Calif. 90230

[21] Appl. No.: 452,097

[22] Filed: Mar. 18, 1974

Related U.S. Application Data

[63] Continuation-in-part of Ser. No. 156,406, Jun. 24, 1971, abandoned.

[51] Int. Cl.² ............... C09J 5/00; B32B 3/12; B32B 27/34
[52] U.S. Cl. .................. 156/309; 52/617; 156/293; 156/331; 428/116
[58] Field of Search ............ 52/617, 309.2; 117/122 H; 151/41.7; 156/293, 298, 303.1, 309, 331; 161/214, 327; 427/207 A; 428/116, 435, 458, 474

[56] References Cited

U.S. PATENT DOCUMENTS

| | | | |
|---|---|---|---|
| 2,235,078 | 3/1941 | Meisterhans | 151/41.7 X |
| 2,607,447 | 8/1952 | Tuttle | 52/617 |
| 2,718,485 | 9/1955 | Samuely | 156/3 |
| 3,179,143 | 4/1965 | Schultz et al. | 151/41.7 |
| 3,719,792 | 3/1973 | Cuccaro | 219/230 |
| 3,737,355 | 6/1973 | Epstein et al. | 156/293 |

*Primary Examiner*—William A. Powell
*Assistant Examiner*—Thomas Bokan
*Attorney, Agent, or Firm*—Irvin A. Lavine

[57] ABSTRACT

An installation tool and method of using same for securing fastener insert elements to substrates where the fastener element is provided with a heat meltable material which serves to bond the fastener to the substrate, the installation tool comprising a controllably heated tip for contact with the fastener and a timer means for indicating when a required heating cycle has expired and the tool should be withdrawn from the fastener: the method provides the heating of the meltable material, a resin, above the meltable temperature, but not above an upper temperature beyond which a decrease in resultant bond strength would occur.

8 Claims, 14 Drawing Figures

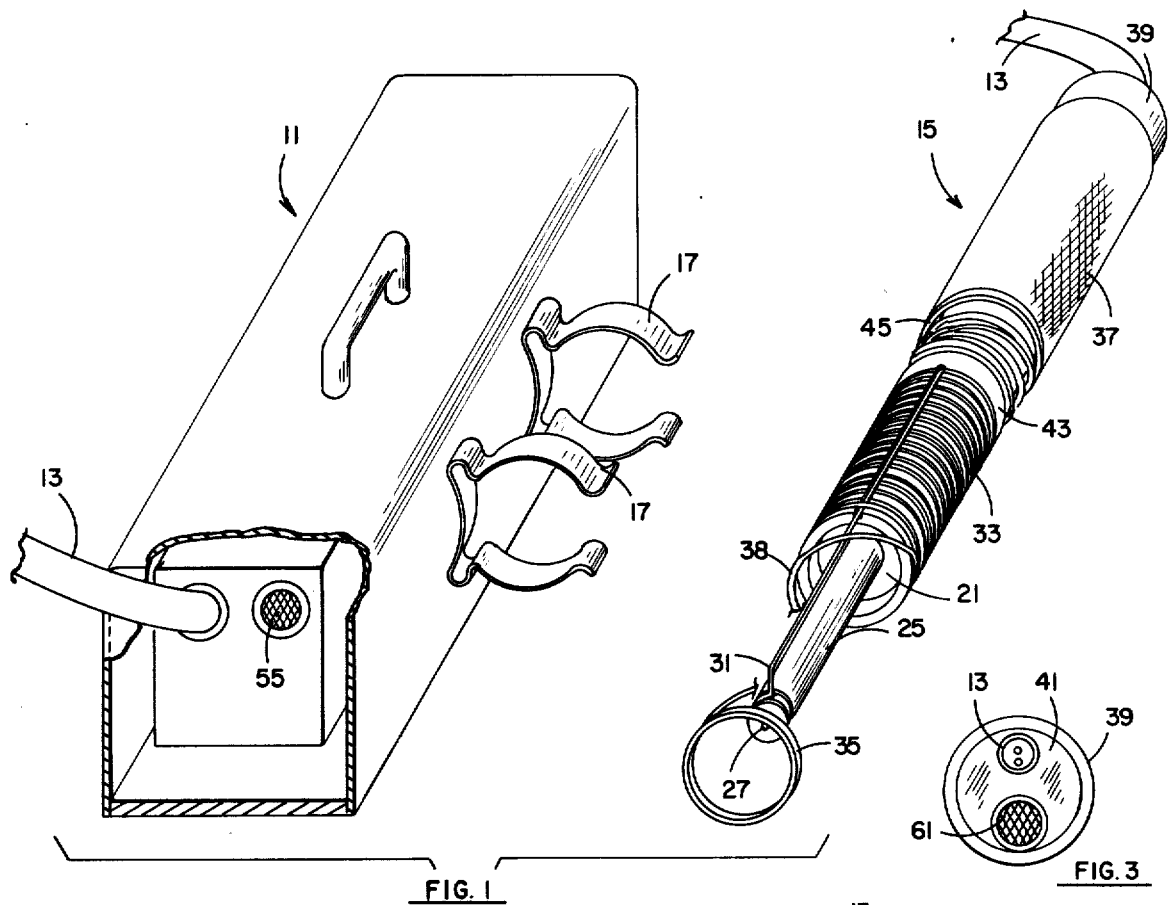
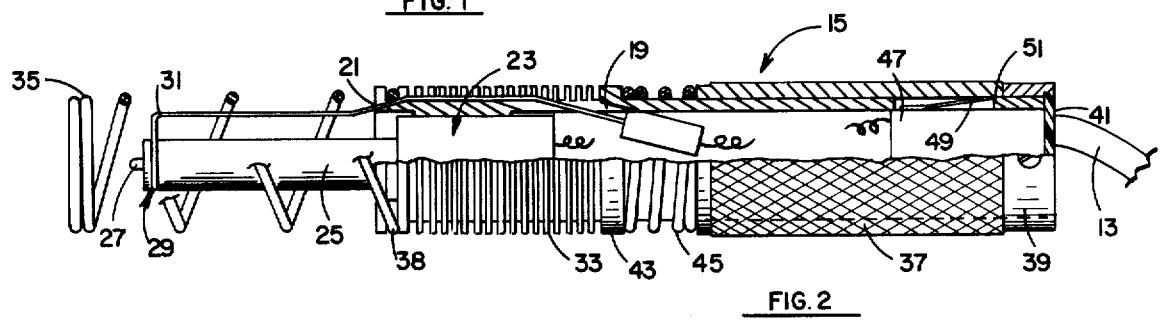
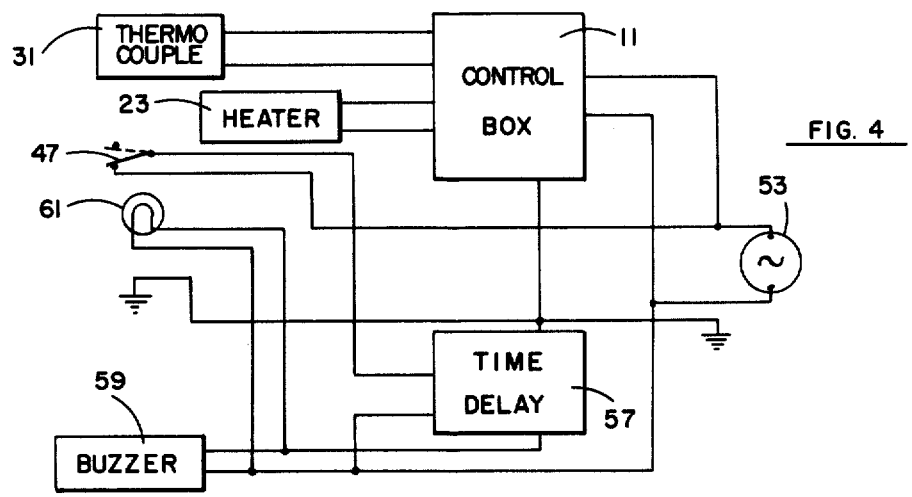

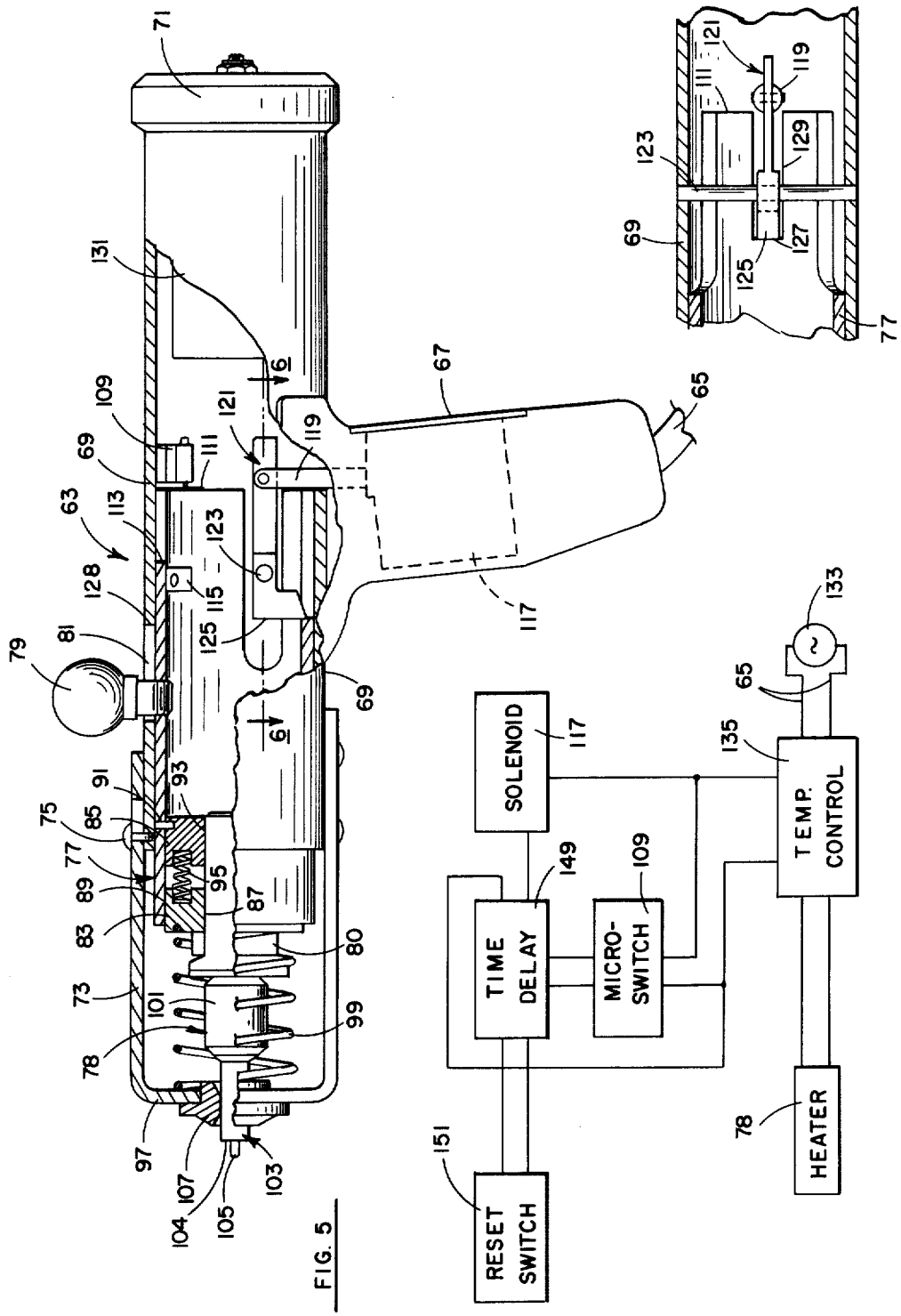

FASTENER INSTALLATION METHOD

CROSS REFERENCE TO RELATED APPLICATION

This application is a continuation-in-part of Ser. No. 156,406 filed June 24, 1971, now abandoned.

In application Ser. No. 67,529 for Insert for Cellular Structures, filed Aug. 27, 1970 now abandoned, and assigned to the same assignee, there is disclosed a fastener insert for disposition in a hole provided in a sandwich panel having spaced skin sheets and a low density core therebetween. The fastener insert described in that copending application, Ser. No. 67,529, has a tubular body and a radially flanged head portion integrally formed at one end of the body. When used, the tubular portion of the insert is placed within a hole provided in the panel structure such that the flange head portion overlays and is adjacent to an outer skin sheet. That particular invention is directed to a method of effectively bonding the aforedescribed insert to the sandwich panel. This is achieved by the utilization of a solid meltable material capable of bonding the insert to the panel disposed adjacent at least a portion of the insert head adjoining the tubular body thereof. For example, the solid meltable material can be a disc which is initially seated between the skin and the flange head which upon melting and then solidification will bond the head portion particularly of the fastener to the skin sheet. Additionally, the solid meltable material can surround at least a portion of the tubular body and upon melting and resolidification will bond a portion of the tubular body to the adjacent portion of the low density core in contact therewith. Various factors affect whether or not the meltable material will be only under the flanged head or also along the tubular body. These include the load on the fastener to be used, material of construction for the adjacent honeycomb skin, and the core thereof, surface area of the flanged insert head, size of hole provided in the honeycomb, and the like.

As was briefly described in the aforementioned copending application Ser. No. 67,529, previously filed and shown in FIGS. 1 and 2 thereof, a tool is preferably utilized to apply heat to the insert which being metal serves as a conductor thereof. The heat is sufficient to melt the solid meltable material so that it will wet the surfaces of the fastener insert and the sandwich panel to achieve the desired bonding.

The aforementioned copending application Ser. No. 67,529 describes several solid meltable materials that can be utilized in accord with that invention. A preferred type, for example, mentioned in the application were polyamide resins, such as various types of nylons. These materials have a melting point of about 450° F and either chemically bond or mechanically bond to the sandwich panel and insert. As indicated therein, the heating temperature utilized should be above the melting point of 450° F, and in fact it is preferred that the temperature be in the range of 800° to 900° F since it was found that the higher temperature range increases the tensile strength of the resulting cooled material as compared to heating at lower temperatures. It should be appreciated that the tool utilized to heat the insert and melt the meltable material can have a temperature at the desired melt temperature for the meltable material.

The portion of the installation tool used to heat the fastener insert so as to cause the melting of the meltable material is preferably at a temperature considerably in excess of the desired temperature to which the material is to be melted. For example, where it is particularly desirable to heat the meltable material itself to a temperature of 550° to 650° F, the heated tip portion of the installation tool will have a temperature typically in the range of 850° to 900° F. The tool is hotter than the temperature to which the meltable material is to be subjected, mainly, in order to speed the installation process. It should be apparent that the installation tool can be of the desired melt temperature; however, it would take an unduly long period of time for the fastener insert and the melted material to stabilize at that temperature, whereas, if the installation tool is at a considerably higher temperature than desired, the period of installation can be shortened.

The temperature of the installation tool as indicated above, is such that one cannot leave the tool in contact with the fastener insert for too long a period, mainly because the bond between the fastener insert and honeycomb deteriorates. For example, using a heated tip between 850° and 900° F with a polyamide meltable material, bond strength begins to deteriorate after about 29 seconds of heating. For this reason, it is preferred that there be a timer mechanism to indicate when the installation tool should be withdrawn from the fastener insert or at least the heated tip or head of the tool be withdrawn so that heat will no longer be conducted to the meltable material during installation. The timer or time indicating means will be related to the type of material utilized and the desired temperature to which it is to be heated taking into consideration the heat transfer ability of the particular fastener insert utilized and the temperature of the installation tool head which is inserted in the fastener. It should further be pointed out that the installation tool cannot be at an excessively high temperature. The reason for this is that there would be too little margin of error for the time duration in which it is to be applied to the fastener insert. That is, if the tool was at an excessively high temperature the time cycle tolerance would become impractical and it would be possible to overly heat the meltable material such that it would flow out of the desired location or even decompose.

Briefly, the herein invention is directed to a suitable installation tool and method of using same for the above described application of heating a fastener insert to a temperature sufficient to melt a solid bonding material provided with the insert. The installation tool has a heated tip portion terminating in a reduced diameter portion which is insertable within an internally open diameter portion of the fastener insert, so that the insert can conduct heat to the meltable material. A heated shoulder portion adjacent to the reduced diameter portion of the tip has a diameter larger than that of the internally open diameter of the insert so that it will overlay and contact the radially flanged head portion thereof.

In the tool of the invention, the tip is preferably preheated prior to utilization for installation and thus the controlling factor in the use of the tool and construction thereof is properly timing the application of the heated tip of the tool to an individual insert. Thus, means are provided which actuate upon insertion of the tip of the tool into the fastener insert and serve to time the duration of contact of the tip with the fastener insert. At the expiration of the preset or predetermined time period, a visual and/or audio means, such as a buzzer, is actuated in most of the embodiments disclosed whereupon the tool is manually withdrawn from the insert. In an additional embodiment, means are provided for automatically withdrawing the tip of the installation tool from the fastener insert at the expiration of the preset time period.

Various embodiments of the device include ones having a pistol-type grip to better and more accurately control the placement of the tip of the installation tool. In another embodiment, the tool is mounted on a heat conductive base plate which serves as a heat sink to cool the fastener insert after the tip is withdrawn therefrom and the base plate is moved thereover.

The method provides for the heating of the resinous heat meltable bonding material to a temperature above the melting point thereof, but not above a temperature beyond which there would be a decrease in the resultant bond strength, to thereby achieve a sufficiently high bond strength with a minimum of time required for installation.

It is believed that the invention will be better understood from the following detailed description and drawings in which:

FIG. 1 is a fragmented pictorial perspective view of a first embodiment of the invention.

FIG. 2 is a partially sectioned cross sectional view of the tool portion of the device of FIG. 1.

FIG. 3 is an end view taken along lines 3—3 of FIG. 2.

FIG. 4 is a schematic diagram of the circuitry for the embodiment of FIG. 1.

FIG. 5 is a partially sectioned plan view of a second embodiment of the invention.

FIG. 6 is a view taken along line 6—6 of FIG. 5.

FIG. 7 is a schematic diagram of circuitry for the embodiment of FIG. 5.

Figures 9, 10:
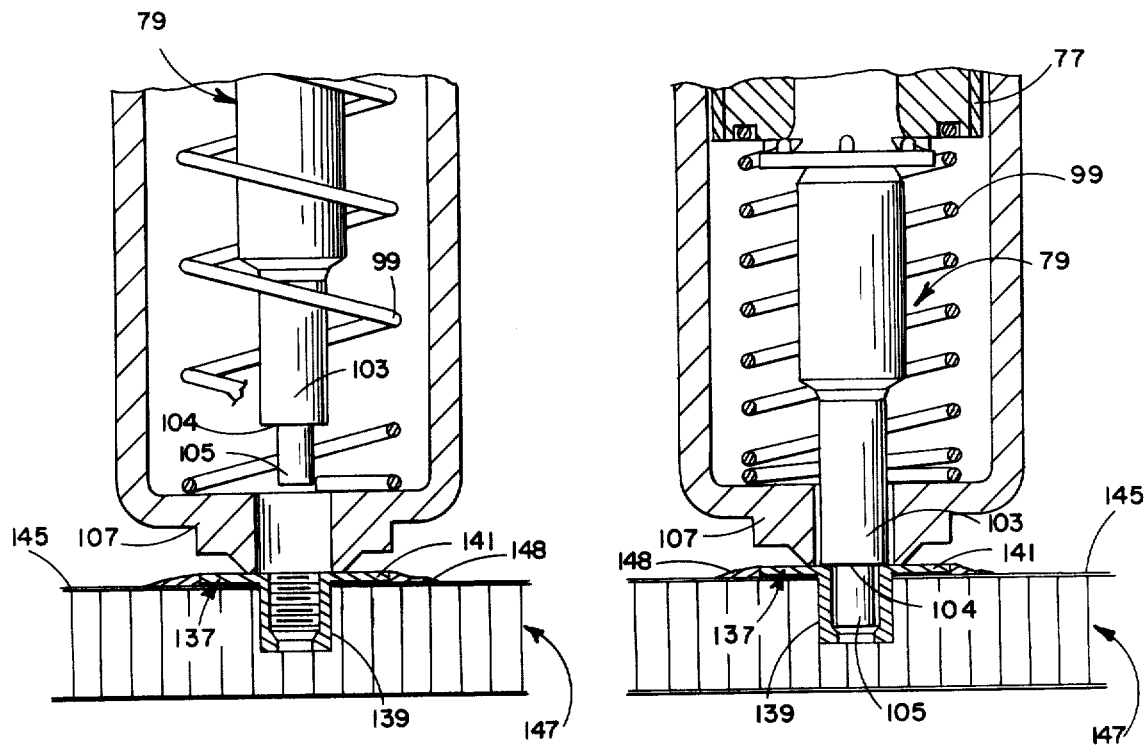
FIG. 9 is a partially sectioned view of the end of the device of FIG. 5 inserted in an insert shown in FIG. 8.
FIG. 10 is a partially sectioned view wherein the tip of the device shown in FIG. 9 is withdrawn from the insert.

Turning now to the drawings, there is seen in FIGS. 1-4 a first embodiment of an installation tool of this invention. The device is comprised of a control box 11 which is connected by a cord, not shown, to a suitable AC source. A lead 13 from the control box is in turn connected to an installation tool 15 having a generally tubular configuration. A pair of clamps 17 mounted on the control box 11 serve as means for storing the tool portion 15 when not in use.

The tool 15, as seen in detail in FIG. 2, has a main cylindrically shaped housing 19 having an open end 21. Disposed within the housing 19 adjacent the end 21 is a heater element 23 having an elongated neck portion 25 extending from the housing 19 through the open end 21 and terminating in a tip 29. The heater element 23 is of conventional construction and is similar to that utilized or found in soldering tools. The elongate portion 25 is preferably ceramic insulative housing which surround a resistive element not shown, which serves to heat the metal tip 29 having an end portion 27 of reduced diameter serving to guide the placement of the tip relative to an insert. A thermocouple element 31 is connected to the elongated portion 25 adjacent the tip portion 29 and extends therefrom to within the housing 19 so as to sense the temperature at the tip end of the tool and provide a feedback so that the temperature can be adequately controlled at a desired temperature. A portion of the housing 19 has a plurality of heat reflective fins 33 in the area of the heater element 23 which helps to dissipate the heat buildup and prevent the tool from becoming too hot for the user to handle. A protective coil spring 35 is connected at one end 38 to the open end 21 of the housing and surrounds the elongate portion 25 of the heater and mainly serves to prevent one from accidentally touching heated tip 29 when the tool is at rest.

The installation tool 15 is held by a narrow cylindrical handle portion 37 which surrounds and is slidable on the cylindrical housing 19. The handle portion 37 slides between an end cap 39 which is fixedly secured to the housing 19, the end cap having a transparent end window 41, and a flanged portion 43 integrally formed with the housing 19 adjacent the plurality of heat radiating fins 33. The slidable handle 37 is separated from the flange portion 43 by a coiled spring 45 which surrounds the housing 19. The spring 45 serves to maintain the slidable handle 37 in a rearward position against the end cap 39 when not gripped or used. The spring 45, however, is relatively weak and can be easily overcome when the device is gripped at the handle portion 37 and pushed downwardly into an insert for application of heat thereto.

Located within the housing adjacent the rear thereof is a microswitch element 47 which has a spring element 49 that extends into a slot 51 provided in the housing. In the position shown in FIG. 2, this microswitch is in an open position. When the handle 37 if forced forwardly toward the tip compressing the spring 45, the spring 49 of the microswitch is exposed and extends downwardly from the slot 51 closing the microswitch.

The operation of the device will be further explained with regard to the schematic diagram shown in FIG. 4. An AC power source 53 provides energy to the control box 11, which contains a means for regulating the heater 23 in response to the input from the thermocouple 31. In other words, the control box 11 contains a thermostatic type control which is sensed by the thermocouple 31 to maintain the heater 23 at the desired preset temperature.

When the preset temperature is reached at the heater 23, a light 55 on the control box 11 can serve as an indicator thereof. This tells the user that the tool is now ready to be applied to the inserts. The user then grips the handle portion 37 of the device 15 and centers it over an insert so as to apply the tip 29 thereto. As the user forces the reduced portion 27 into the insert, the handle 37 first moves forwardly compressing the spring 45 and moving the microswitch 47 from an open position shown in dotted outline in FIG. 4 to a closed position as seen. When the microswitch is closed it feeds to a time delay device 57 disposed within the control box 11. The time delay 57 can be a conventional mechanical or electrical device which can be set to a given time interval of for example 20 seconds or the like. At the end of the preset time period the time delay actuates a buzzer 59 disposed in the control box 11 and a light 61 disposed within the housing 19 of the installation tool 15 at its rear end thereof adjacent the transparent window 41 as seen in FIG. 3. Thus, the user of the tool has both an audio and visual indication that the tool should be withdrawn from the insert. When the installation tool is withdrawn or pulled back, the handle 37 depresses the spring element 49 of the microswitch thus in effect opening the switch which in turn sets the time delay mechanism 57 back to zero and serves to close the circuit to the light 61 and buzzer 59 from the time delay.

Turning now to FIGS. 5-11, there is seen a second embodiment of this invention wherein a heated tip is automatically withdrawn from a fastener element at the completion of a heating cycle. The tool 63 of this embodiment is essentially a self contained unit which is directly connected to a suitable AC power source by way of a cord 65. The tool is provided with a pistol grip 67 to facilitate its handling and placement relative to the fastener insert with which it is to be utilized. The handle 67 is connected to a main cylindrical housing 69 having a rear end enclosed by an end cap 71. The front end of the housing 69 is covered by a removable cylindrical enclosure 73 which is secured thereto by screws 75. The removable portion 73 allows access to the internal portion of the device for assembly and disassembly as well as repair.

Disposed within the cylindrical housing 69 is a tubular element 77 which has a knob 79 fixedly secured thereto which slides within a slot 81 provided in the outer cylindrical housing 69 so that a user can move the knob 79 in a forward direction shown toward the front of the slot 81 causing the inner tubular element 77 to move therewith.

Extending forwardly from the tubular element 77 is a heater device 78 which has a portion 80 concentrically disposed within the tube 77. Portion 80 can be a plastic housing for the relatively conventional resistively heated device 78, and is secured relative to the tubular element 77 by means of first disc 83 and a second disc 85 which surround the housing 80. The first disc 83 is tight fitted to the portion 80 at its inner diameter 87 while at its outer diameter 89 is in sliding engagement with the tube 77. A rear disc 85 is fixedly secured by set screws 91 to the tube 77 while at its inner diameter 93 is in sliding engagement with the plastic housing 80. The two discs are separated from each other by a plurality of coil springs 95 seated in corresponding facing recesses within the two discs. Extending from the disc 83 to the forward end 97 of the device is a separate coil spring 99 which surrounds the heater device 78 and serves to exert a continual pressure in a rearward direction away from the front of the device by exerting such pressure on the surface of disc 83.

The heater 78 has a ceramic insulative mid portion 101 and an exposed metal heated cylindrical portion 103 with a shoulder 104 preceding a reduced diameter end portion 105 used for location and insertion within the fastener insert. The shoulder 104 and reduced end portion 105 is this the required heated tip of this device. A protective insulative ring 107 of asbestos or other suitable material is located in the forward end 97 of the device surrounding the hot metal cylindrical portion 103 and serves as a bearing surface against the fastener insert when the tool is applied thereto.

Mounted on the housing 69 and disposed therein is a microswitch 109. The rear end 111 of the movable inner tube 77 has a cut out portion 113 in the area of the microswitch 109 allowing the tube 77 to move past the microswitch a distance equivalent to the slot 81 whereupon a tab member 115 mounted on the tube 77 will engage the microswitch in a manner which will be further described. The microswitch 109 is normally in an open position when the tab portion 115 on tube 77 is thereagainst. When knob 79 is moved forward toward the end portion 105 as in the position shown in FIG. 5, and tab 115 moves away from the microswitch 109, the microswitch is closed.

Disposed in the pistol grip 67 of the devide is a solenoid 117 shown in dotted outline having an actuator arm 119. The arm 119 moves an L shaped locking arm 121 which is pivotally connected within the housing 69 on an axle 123 as particularly seen in FIG. 6. In the locked position shown in FIG. 5, a downwardly extending portion 125 of the locking arm 121 engages a forward end 127 of a recess 129 formed in the sliding inner tube 77. The function of the locking arm thus is to prevent a rearward movement of the inner tube 77 and thus heated cylinder 103 and end portion 105 from the insert member when the locking arm is depressed.

When the solenoid 117 is actuated, as more fully described hereinafter, actuator arm 119 is pulled downwardly into the solenoid raising the portion 125 of locking arm 121 above the tube 77 allowing the force of the spring 99 to push the tube 77 backwardly until the knob 79 comes to rest at a rear end 128 of the slot 81. When the solenoid is so actuated, as the portion 125 of the arm moves upwardly, it will tend to push the tube 77 slightly forward in order that it will clear the portion of the tube with which it is engaged. If the tube was stationary, portion 125 would tend to lock against the surface 127 of the recess 129. In view of this, the above described arrangement of discs 83 and 85 is utilized. As the portion 125 moves upwardly and pushes the tube 77 forward, disc 85 which is connected to the tube 77 moves forward toward disc 83 compressing the springs 95. This is a very slight movement but is sufficient as indicated to allow the portion 125 to clear the tube. In view of this arrangement, the heated cylinder 103 and end portion 105 remains stationary since the disc 83 is slidable relative to the tube 77, being fixedly secured to the portion 80 of the heater 78.

Disposed toward the rear end cap 71 of the outer housing 69 and therein is a time delay 131 and reset switch 151. In this device, the temperature control is an external element which is plugged into a socket provided (not shown). The function of these items will be explained in the following description of the schematic diagram of FIG. 7.

An AC power source 133 is directed to the device through line 65 to a temperature control 135 which is a variable voltage type control that is set at a desired temperature for the tool. The heater 78 is connected to the temperature control 135 and is brought up to the preset temperature when the device is plugged into the source 133.

Figure 8:
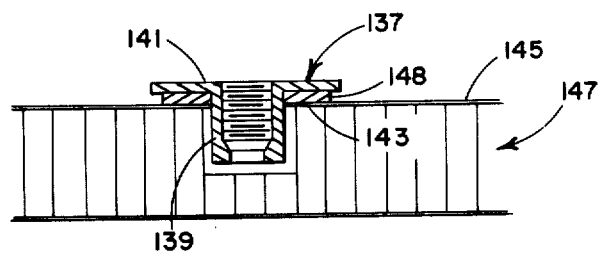
FIG. 8 is a partially sectioned view of an insert within a honeycomb structure.

In the starting position, before the tool is used, as seen in FIG. 8, an insert 137 having a tubular body 139 and a radial extending flat head portion 141 formed therewith, is seated within a hole 143 provided in a thin skin surface 145 of a low density core or honeycomb type structure 147. A flat disc 148 of a meltable resin material such as a polyamide resin is seated between the head portion 141 of the fastener insert, and the skin surface 145.

Prior to use, the knob 79 is in a retracted position within slot 81, resting against the rear surface 128. In this position, the downward extending portion 125 of the locking arm 121 connected to the solenoid is resting on an inner wall of the slidable tube 77, but not in any locking engagement therewith. Additionally, microswitch 109 is in an open position and normally is in contact with the tabular portion 115. In the diagram of FIG. 7, the AC power source for the microswitch and other components is seen as being derived from the temperature control, through the components other than the heater are in no way actuated or controlled by the temperature control.

The tool is then seated over the insert 137. In this position, of course, the end portion 105 is retracted and is not extending beyond the front of the tool. The knob 79 is then moved forward in the position shown in FIG. 5 and the end portion 105 of the heater element engages the insert with the shoulder portion 104 resting in contact with the surface 141 of the insert element maintaining the main heat conductive path to the insert. The diameter of the end 105 is less than that of the inner diameter of the insert so that the threads will not be affected. Thus, the end 105 is not the primary source of heat supply to the insert. When the knob 79 is moved forward, tab 115 disengages from the microswitch 109. The microswitch opens, causing a time delay 149 connected thereto to begin counting the time period that has been preset for the heating duration. Additionally, as has been indicated, when the knob 79 is moved to the forward position, the portion 125 of the locking arm 121 has dropped downwardly into the recess 29 and engages the surface 127 thereof of the inner tube 77 locking it in place and resisting the rearward movement thereof due to the spring 99.

At the end of the preset time period the time delay 149 feeds a signal to solenoid 117 connected thereto and the solenoid pulls arm 119 downwardly raising the portion 125 out of the recess 129 and allows the spring 99 to retract the heater element as seen in FIG. 10. When the tab 115 strikes microswitch 109 and closes it, a reset switch 151 resets the time delay back to zero so that it can begin counting again when it is opened.

Figure 11:
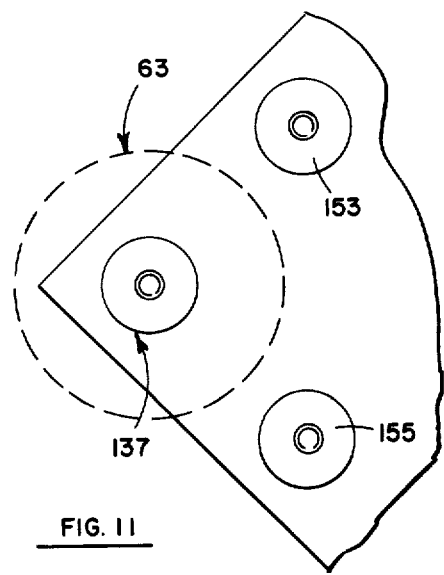
FIG. 11 is a partial plan view of a plurality of inserts disposed on a honeycomb structure.

While the tool is in contact with the metal fastener insert 137, as seen in FIG. 9, the meltable plastic 148 is heated by the heat conductive metal insert to its melting point whereby it wets both the fastener and the thin sheet 145 of the honeycomb material 147, flowing slightly between the two while it is in a melted state. After the tool is withdrawn as seen in FIG. 10, the material begins to harden and eventually sets and bonds the fastener insert to the core material 147. As shown in FIG. 11, the tool 163 can be moved from a first fastener 137 onto a next fastener insert 153 and then on to insert 155 in relatively rapid succession. As can be seen, this device and method of installation allows heat to be directed solely at the metal insert being installed without affecting the honeycomb structure which could be deleteriously affected by heat when made of a resin impregnated material. The heat conductive path is from the heated tip of the tool through metal insert to the meltable material.

Figure 12:
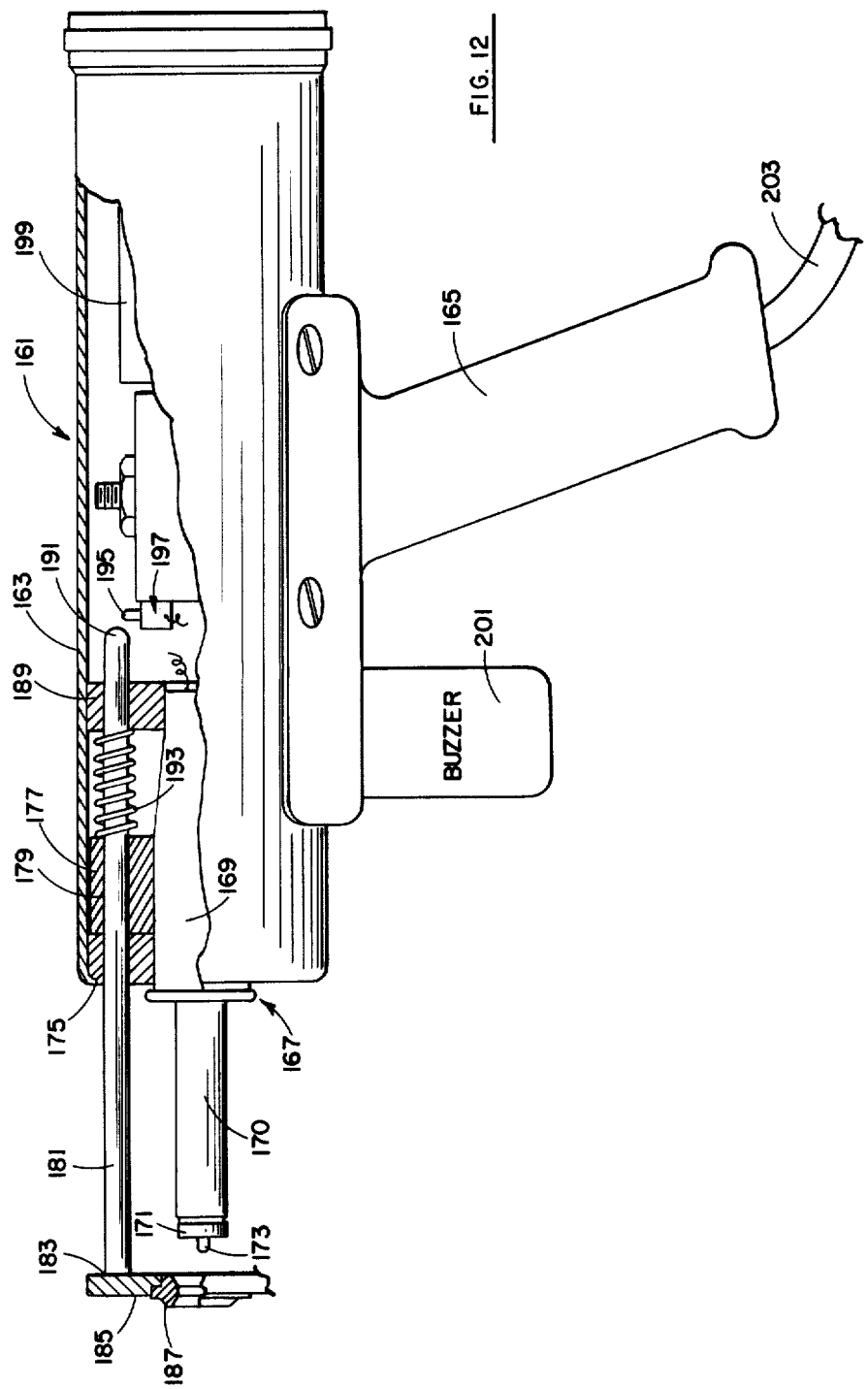
FIG. 12 is a partially sectioned plan view of a third embodiment of the invention.

Turning now to FIG. 12 there is seen a third embodiment of this invention which is comprised of a device 161 having a cylindrical outer housing 163 and a pistol grip 165 connected thereto. Partially supported within the housing 163 is a heating element 167 having a main housing 169 within the tool and an elongated cylindrical ceramic insulated portion 170 extending therefrom. An exposed heated metal shoulder 171 of tip portion 173 extends from the insulated portion 170 and is used for heating the insert in the manner previously shown and described.

The housing 163 has a front plate 175 which encloses the front end thereof. Plate 175 further serves to support the housing 169 of the heater 167 as well as having affixed thereto a support block 177. Support block 177 has an aperture 179 therethough which serves to support rod member 181 in a position parallel and spatially disposed from the heater 167. Rod 181 has attached to its forward end 183 a bearing plate 185 having an insert 187 therein through which the heated tip portion 173 and the insulated portion 178 of the heater element 167 can pass. Insert 187 serves as a guide and bearing surface for application of the tool to an insert.

Additionally disposed and fixedly secured within the housing 163 is a support block 189 through which the rearward end 191 of the rod 181 extends. When the device is utilized, the tip 173 is pushed down and protrudes through the insert element 187. This in turn causes the block member 177 to compress a spring 193 disposed between it and block 189. During the depression of the tool, the rear end 191 of the rod 181 passes over an arm 195 of a microswitch element 197 depressing the arm and closing the microswitch. This in turn starts a time delay mechanism 199 which upon completion of a preset interval causes a buzzer 201 to be actuated giving audible indication of the end of the period. Upon retraction of the tool, the spring 193 forces the rod 181 forward disengaging the end 191 from contact with arm 195 of the microswitch allowing it to return to its normal position and resetting the time delay to zero. In order to facilitate the depression of the arm 195, it is to be noted that it is preferred that the end 191 of the rod 181 be rounded. Rod 181 is one of three equidistantly spaced rods (the other two not seen) which serve as guides for the relative movement of the device to the bearing plate. Rod 181 is the only one which contacts and actuates microswitch 197. The schematic circuit diagram not shown for the device described with regard to FIG. 12 is essentially the same diagram as shown in FIG. 4, except that the herein device does not have a visual lamp or light means to indicate the completion of a heating cycle; the sole indication being the buzzer element 201. Additionally, of course, the herein device does not provide a thermocouple as a cost saving provision.

Figures 13, 14:
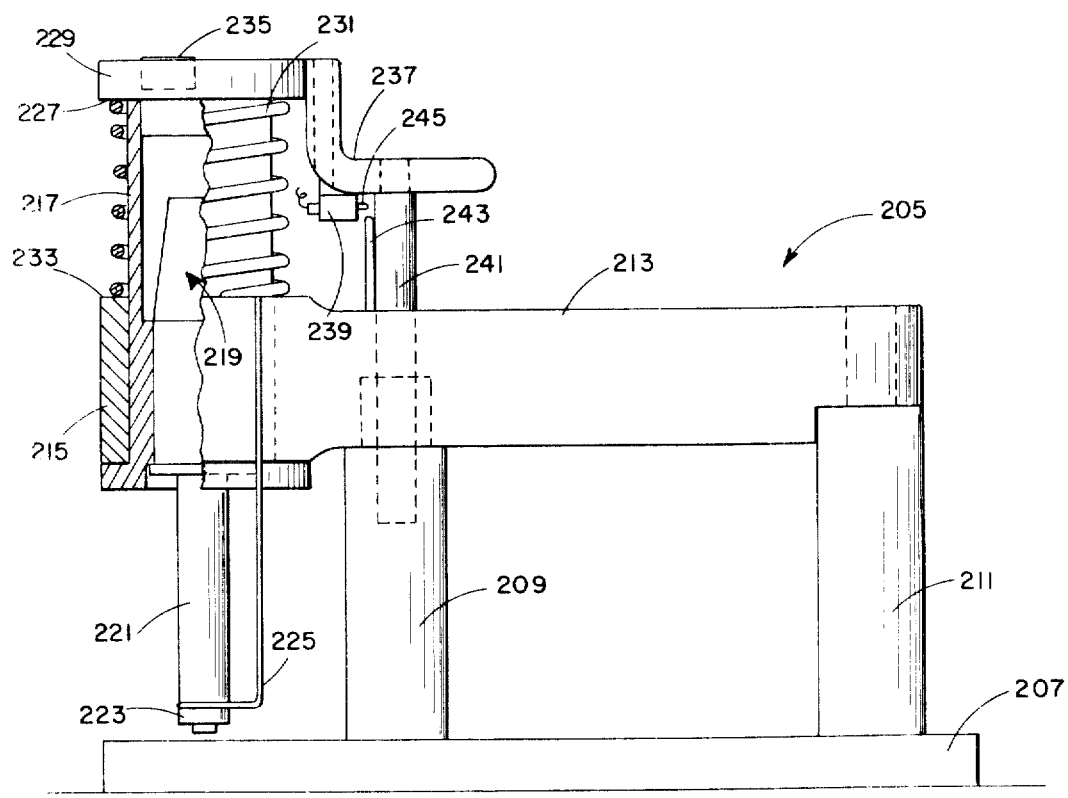
FIG. 13 is a partially sectioned view of a fourth embodiment of the invention.
FIG. 14 is a top plan view of the device of FIG. 13.

Turning now to FIGS. 13 and 14 there is seen a further embodiment of this invention which is similar to a stapling gun. The device 205 has a fixed flat base 207 which has two or more vertical support posts 209 and 211 extending therefrom. The support posts 209 and 211 support a main frame 213 in the position parallel to the base 207. The frame 213 has a cylindrical head portion 215 on which is slidably disposed a sleeve 217 that moves vertically to the base 207. Sleeve 217 is the main housing for a heater device 219. The heater element 219 has an elongated ceramic insulative portion 221 terminating in a heated tip end 223. A thermocouple 225 is connected to the heated tip 223 in a manner similar to the embodiment shown in FIG. 1.

The upper end 227 of the sleeve 217 has an end cap 229 affixed thereto. A spring 231 extends between the cap 229 and a top 233 of the head portion 215 of frame member 213. The spring serves to maintain the tip 223 above the base 207 and allows for its return to this position after it has been depressed. End cap 229 further has a light 235 mounted therein for visual indication to the user at the end of the heating cycle in a manner similar to the light utilized in the device of FIG. 1.

Affixed to the end cap 229 and extending downwardly from one side thereof, is an L-shaped thumb depressor element 237 which has a microswitch 239 mounted thereon. The depressor 237 is affixed additionally to a vertical rod 241 which slides within support 209 serving to prevent undue bending of the depressor 237 maintaining a completely vertical downward movement of the depressor together with the heating tip 223 when the tip is applied to a fastener insert.

When the L-shaped depressor 237 is pressed downwardly toward the frame 213 which can be gripped by the remaining fingers of the hand while the thumb rests on the element 237, the microswitch 239 contacts a fixed rod 243 which serves to depress portion 245 of the microswitch closing it at the point where the heated tip portion 223 wound contact the fastener insert. This in turn, of course, starts a time delay mechanism contained in heat control unit (not shown) as in FIG. 7 within the slidable sleeve 217 which will cause the light 235 to become visible and buzzer to sound in the control unit at the end of the delay allowing the user to release pressure on the depressor element 237 and permit the heated tip 223 to be withdrawn from the fastener insert.

To recapitulate, the method hereinabove noted is for installing a metal fastener in a honeycomb panel wherein the bonding material is polyamide resin which is used with a tool having a temperature of approximately 850° - 900° F. Since the above referenced polyamide resin has a melting point of about 450° F, the length of time which the tool at the noted temperature is held in contact with the metal insert fastener must, as a minimum, be sufficiently long to heat the resin to a temperature above its noted melting point. In addition, however, with the noted material and tool temperature, the strength of the resulting bond will increase as the time for heating of the bonding material increases, up to a particular time, or time range: this will result in a heating of the bonding material up to a particular temperature or temperature range. With the polyamide resin material above referenced, bond strength begins to deteriorate after about 29 seconds of heating with the tool tip at between 850° - 900° F. Consequently, the time of heating of the polyamide resin with the noted tool temperature does not exceed 29 seconds, in accordance with the invention, in order to prevent deterioration of bond strength. As will be appreciated, merely heating for a sufficient amount of time to melt the synthetic resin bonding material will produce a bonding of the insert to the panel by the resin material, but the bond achieved thereby will be weaker than the bond which is achieved in accordance with the present method, wherein there is a longer heating time which causes a higher temperature of the bonding material up to the temperature resulting from the twenty-nine second maximum time noted. This maximum time, for this particular material gives maximum bond strength.

In a further example, solid meltable synthetic resin bonding material sold under the tradename Milvex, produced by General Mills, Inc., a polyamide, was used. With a 100 watt tool operating at a temperature of 800° F, bond strength increased up to a maximum in approximately 6 seconds, and upon further heating the bond strength significantly decreased. Using the Milvex bonding material and a tool temperature of 700° F, bond strength increased rapidly up to about 6 seconds, and thereafter increased at a diminished rate up to about 10 seconds. For heating times longer than ten seconds, the bond strength deteriorated. The metal insert used in this example was C1050 alloy steel with an outside diameter of 0.222 inches, an inside diameter of 0.168 before tapping, the flange outer diameter being 0.75 inches and the flange thickness being 0.020 to 0.030 inches. The axial length was 0.22 inches. The Milvex bonding material was in the form of a washer having an outside diameter of 0.562 inches, press fitted on the insert tubular body, and a thickness of 0.020 inches. The honeycomb insert panel was one made in accordance with Lockheed Aircraft Company specification C-28-1247 type 4A, which is a honeycomb panel with a Nomex honeycomb core of one-eighth inch cells, having a thickness of 0.75 inches and a skin thickness of 0.020 inches, the skins being made of glass fabric. This panel has a density of 1.8 lbs., per cubic foot.

In another example, a dual adhesive system was used, with a metal insert of the same material. The metal insert had a cylindrical body of 0.20 inches outside diameter, and 0.140 inches inside diameter, before being tapped to provide threads. The diameter of the flange was 0.625 inches, and the flange thickness was approximately 0.02 inches. The axial length was about 0.21 inches. The dual adhesive system was made up of two washers, one of 6/6 Nylon and one of American Cyanami de Company adhesive FM 100, a polyamide/epoxy. The outside diameters of the washers were both 0.625 inches, press fitted on the insert, and the total thickness of the dual adhesive system washer was 0.030 inches, with the FM 1000 adhesive being one-half the thickness of the Nylon adhesive. In this example, using a 50 watt tool at a temperature of 900° F, bond strength deterioration begins after approximately twenty-six seconds. The panel used in this example was a Douglas DC 10 interior honeycomb panel with Nomex core having 0.250 inch cells with acoustic filler. The top skin was of fiber glass, 0.020 inches thick, and the total thickness of the honeycomb panel was 0.5 inches.

In still another example, an adhesive material designated as Montac 1040 was used, this being a modified polyamide material produced by Monsanto Company. The metal insert is of the same material and same size as that described above in connection with the dual adhesive system. The Montac 1040 adhesive material is furnished in the form of pellets, and to conduct the test, approximately 5 grams of pellets were placed under the flange of the insert, being generally a layer only one pellet deep, and substantially covering the area beneath the flange. The panel is the same as that described above in connection with the dual adhesive system. With a 50 watt tool operating at 900° F, bond strength began to deteriorate after approximately fifteen seconds, the test being conducted using 5 second intervals. In a similar 5 second interval test, with a 50 watt tool at a temperature of 600° F, bond strength deteriorated after 20 seconds.

Where there have been given dimensions, it will be understood that they are approximate, as are the temperatures noted herein.

A significant test of bond strength, as hereinabove referred to, is a tensile test. To conduct such a test, a small portion of a honeycomb panel is obtained, for example, one which is square in plan form, being three inches on a side. A hole of the appropriate size is bored in the center, and the metallic insert is secured in position as hereinabove set forth, the process proceeding as discussed in connection with FIGS. 8, 9 and 10. The test specimen with fastener thus adhered is placed in a suitable tensile testing machine with the panel supported by a spacer containing a 2 inch diameter hole. The fastener is centered in the hole, a screw is threaded into a fastener and this assemblage is tensile loaded in a direction so as to attempt to pull the fastener through the hole in the spacer. The load is applied at, for example, a rate of 0.05 inch per minute.

It will be obvious to those skilled in the art that various changes may be made without departing from the spirit of the invention and therefore the invention is not limited to what is shown in the drawings and described in the specification but only as indicated in the appended claims.

I claim:

1. A method of installing a fastener insert to a panel having a cavity extending thereinto from one face thereof, the method comprising the following steps in combination:
   providing a fastener insert having an axially extending body and a flanged heat conductive head portion integrally formed at one end of the body;
   providing on an undersurface of said flange synthetic resin bonding material which is solid at room temperature, melts at an elevated temperature and resolidifies on cooling to bond adjacent structures;
   providing a heating tool having an operating temperature substantially above the melting temperature of said bonding material;
   providing a panel having a cavity, said cavity having a cross-sectional size adapted to receive said body and a depth sufficient to allow engagement between said bonding material and portion of the outer surface of said panel adjacent said cavity when said body is inserted in said cavity;
   inserting said body in said cavity to provide engagement between said flanged head portion and said bonding material and between said bonding material and said outer surface portions of said panel;
   transferring heat from said heating tool to said fastener insert and to said bonding material by placing said heating tool in proximity to said insert, and thereby melting said bonding material;
   said bonding material being characterized by yielding increased bonding strength between said insert and panel after cooling upon an increase in the time of heat transfer from said heating tool beyond the time required to melt said bonding material, and up to a maximum time, beyond which said maximum time the bonding strength of said bonding material deteriorates, and
   stopping the heating of said bonding material after melting thereof at a time to effect a resulting bonding strength which is approximately the maximum bonding strength of said bonding material.

2. The method of claim 1, wherein said last mentioned step comprises stopping the heating at a time prior to the time at which the resulting bonding strength deteriorates.

3. The method of claim 1, wherein said heating is effected by engaging a portion of said heating tool with the surface of said flanged head portion remote from said panel.

4. The method of claim 3, further comprising:
   applying pressure on said flanged head portion during the heating of said head portion to thereby force said head portion toward said panel and against said bonding material.

5. The method of claim 1, wherein the heating tool operating temperature is approximately 600° - 900° F.

6. The method of claim 1, said body being tubular, and wherein said bonding material is additionally heated by introducing a heated element into said body.

7. The method of claim 1, wherein said bonding material consists essentially of a polyamide.

8. The method of claim 7, said bonding material consisting essentially of nylon.

* * * * *